US008134985B2

(12) United States Patent
Hong

(10) Patent No.: US 8,134,985 B2
(45) Date of Patent: Mar. 13, 2012

(54) SYSTEM AND METHOD FOR WLAN MULTI-CHANNEL REDUNDANCY FOR VOIP OPTIMIZATION

(75) Inventor: Deanna Hong, Palo Alto, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 707 days.

(21) Appl. No.: 12/057,631

(22) Filed: Mar. 28, 2008

(65) Prior Publication Data

US 2008/0285528 A1  Nov. 20, 2008

Related U.S. Application Data

(60) Provisional application No. 60/938,582, filed on May 17, 2007.

(51) Int. Cl.
*H04W 4/00* (2009.01)
(52) U.S. Cl. .......................... 370/338; 370/348; 370/346
(58) Field of Classification Search ........................ None
See application file for complete search history.

(56) References Cited

U.S. PATENT DOCUMENTS

| | | | | |
|---|---|---|---|---|
| 5,960,344 | A  * | 9/1999 | Mahany | 455/432.2 |
| 6,580,700 | B1 * | 6/2003 | Pinard et al. | 370/332 |
| 2004/0190477 | A1 * | 9/2004 | Olson et al. | 370/338 |
| 2005/0195733 | A1 * | 9/2005 | Walton et al. | 370/208 |
| 2006/0224763 | A1 * | 10/2006 | Altunbasak et al. | 709/231 |
| 2007/0127421 | A1 * | 6/2007 | D'Amico et al. | 370/338 |
| 2008/0019313 | A1 * | 1/2008 | Vogety | 370/330 |
| 2009/0067628 | A1 * | 3/2009 | Pudney et al. | 380/247 |

OTHER PUBLICATIONS

Lee, "Diversity Control Among Multiple Coders: A Simple Approach to Multiple Decisions", Speech Coding, Sep. 2000., IEEE Workshop, NJ, US, pp. 69-71.

Lee et al., "OLSR-MC: A Proactive Routing Protocol for Multi-Channel Wireless Ad-Hoc Networks", IEEE Wireless Communications and Networking Conference, Apr. 2006, Las Vegas, NV, US, pp. 331-336.

* cited by examiner

*Primary Examiner* — Chi Pham
*Assistant Examiner* — Kouroush Mohebbi

(57) ABSTRACT

A system includes a wireless switch and a plurality of wireless nodes. A mobile device connects to the wireless switch by communicating a packet to the wireless switch via two or more of the plurality of wireless nodes.

11 Claims, 4 Drawing Sheets

Method 200

Method 400

SYSTEM AND METHOD FOR WLAN MULTI-CHANNEL REDUNDANCY FOR VOIP OPTIMIZATION

PRIORITY CLAIM

This application claims the priority to the U.S. Provisional Application Ser. No. 60/938,582, entitled "System and Method for WLAN Multi-Channel Redundancy for VoIP Optimization," filed May 17, 2007. The specification of the above-identified application is incorporated herein by reference.

FIELD OF THE INVENTION

The present invention relates generally to a system and method for optimizing wireless communications by transmitting redundantly to multiple wireless nodes.

BACKGROUND

Voice over Internet Protocol (hereinafter "VoIP") is a commonly-used method for routing voice conversations over the Internet (or, alternately, through any IP-based network). VoIP helps users realize cost savings by transmitting both voice and data traffic over a single network.

One often criticized flaw in traditional VoIP-based communications relates to quality of service. If packets are dropped or lost at any point in a transmission, voice drop-outs can occur. This flaw may be compounded where a user is connected wirelessly, such as using a laptop computer connected to a network using the 802.11b wireless protocol. In such cases, packets can be dropped not just during transmission over the IP-based network, but also during wireless transmission from the source to the IF network.

SUMMARY OF THE INVENTION

The present invention relates to a system includes a wireless switch and a plurality of wireless nodes. A mobile device connects to the wireless switch by communicating a packet to the wireless switch via two or more of the plurality of wireless nodes.

The present invention also relates to a method which includes the following steps: associating a mobile device with at least two wireless nodes; transmitting, by the mobile device, a first packet to a first wireless node of the at least two wireless nodes; and transmitting, by the mobile device, the first packet to a second wireless node of the at least two wireless nodes.

DETAILED DESCRIPTION

Figure 1:
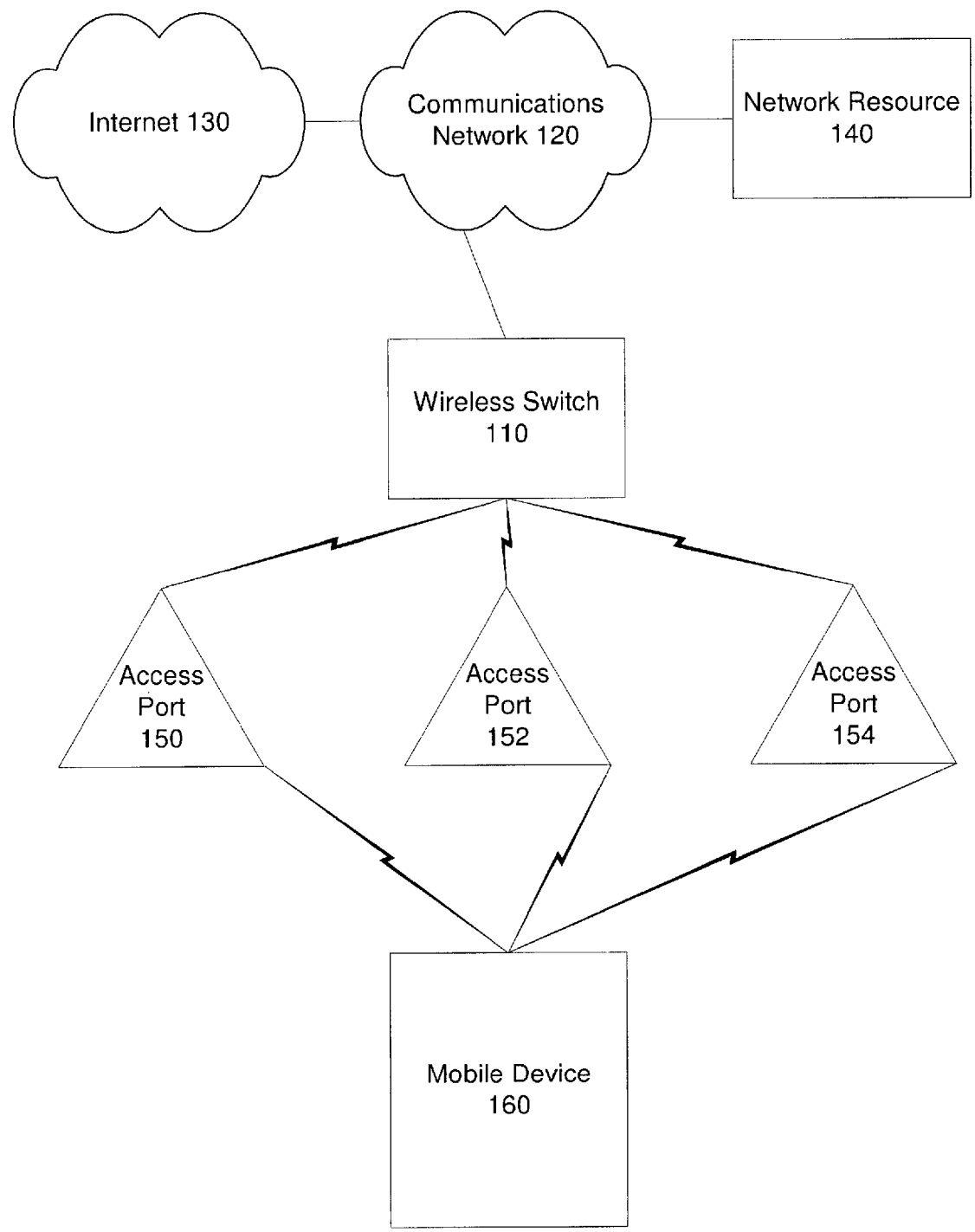
FIG. 1 shows a first exemplary system according to the present invention.

The present invention may be further understood with reference to the following description and the appended drawings, wherein like elements are referred to with the same reference numerals. The present invention describes a system and method for achieving improved VoIP communication by transmitting redundant voice packets on multiple 802.11 channels. According to the exemplary embodiments of the present invention, a mobile device associates with a plurality of wireless nodes, using multiple channels (e.g., 802.11 channels).

It should be noted that this disclosure will use both the terms "access points" and "access ports". Both "access points" and "access ports" provide 802.11 wireless connectivity for mobile devices to access a network. The term "access point" will be used to denote a device that contains its own internal intelligence for routing network traffic, while the term "access port" will be used to denote a device that provides wireless connectivity but operates in conjunction with an external device, such as a wireless switch, which handles routing of network traffic. This disclosure will use the term "wireless node" as a collective descriptor that encompasses both access points and access ports.

FIG. 1 shows a first exemplary embodiment of a system 100 according to the present invention. The system 100 provides a wireless switch 110, which is capable of coordinating the traffic of data in a wireless network. The wireless switch 110 may be, for example, a WS5100 Wireless Switch, manufactured by Motorola. The wireless switch 110 may communicate with a communications network 120, which may be, for example, a corporate intranet. Through the communications network 120, the wireless switch 110 may be able to access the Internet 130, as well as other network resources 140. The present invention also includes embodiments with network topologies in which the wireless switch 110 directly accesses the Internet 130. Network resources 140 may be, for example, data storage, network printing resources, etc., and such resources may reside on the network 120 or the Internet 130.

The wireless switch 110 may also communicate with a plurality of access ports 150, 152, 154. Access ports 150, 152, 154 may be, for example, the AP300 Access Port, manufactured by Motorola. Communication between the wireless switch 110 and the access ports 150, 152, 154 may be wired or wireless. Those of ordinary skill in the art will understand that the precise number of access ports 150, 152, 154 present in the system 100 will vary among different implementations of the system 100; the use of three access ports 150, 152, 154 in FIG. 1 is merely intended to be exemplary. In one implementation, there are sixteen (16) access ports. The access ports 150, 152, 154 have the capability to communicate wirelessly with various other computing resources. Such communication may be accomplished, for example, using one of the IEEE 802.11x family of wireless protocols (e.g., 802.11a, 802.11b, 802.11g).

Figure 2:
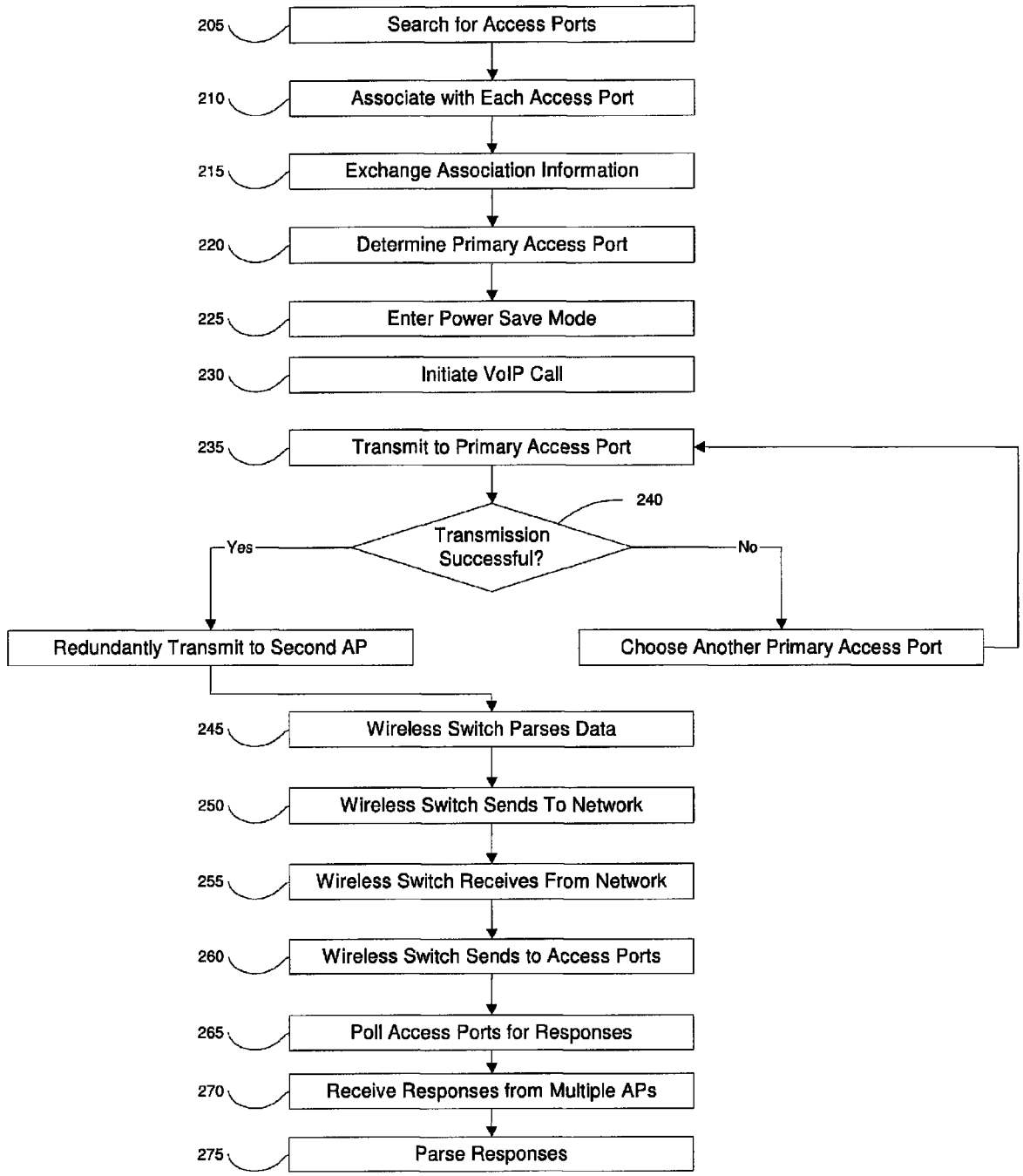
FIG. 2 shows a first exemplary method according to the present invention, by which the exemplary system of FIG. 1 may operate.

According to the present invention, a mobile device 160 may attempt to communicate with the access ports 150, 152, 154. The mobile device may be, for example, a personal digital assistant ("PDA"), a scanner, a mobile computer, etc. The communication may be illustrated by the exemplary method 200 of the present invention shown in FIG. 2. In step 205, the mobile device 160 searches for access ports within its communication range. The communication range may depend on, for example, the type of the device 160 or the communications protocol used. In step 210, the mobile device 160 attempts to associate with all access ports 150, 152, 154 found within its communication range. In other embodiments of the present invention, the number of access ports with which the mobile device 160 associates may be limited to a predetermined maximum. The mobile device 160 attempts to form an association with each of the access ports 150, 152, 154 on a separate 802.11 channel. In the United States a device using the 802.11b wireless protocol has access to channels 1 through 11, with varying frequencies. The mobile device 160 may, for example, attempt to associate with access port 150 on channel 1, with access port 152 on channel 6, and with access port 154 on channel 11.

In alternative exemplary embodiments of the present invention, one or more 802.11 channels may be reserved for a particular type of packets. For example, one exemplary embodiment may reserve channels 9, 10 and 11 on various access ports for VoIP packets while leaving channels 1-8 free to be used for all other types of network traffic.

Once associations have been formed, in step 215, the mobile device 160, the access ports 150, 152, 154, and the wireless switch 110 exchange association information. Association information may be, for example, the location of each access port relative to the other access port; the communication channels available to each access port; the load of each access port (e.g., the number of mobile devices associated with each access port; the number of VoIP calls active on each access port, etc.); the load on the wireless switch 110 (e.g., the number of multi-channel associations being handled by the wireless switch 110, etc.); whether any of the access ports are designated for multi-channel, voice, or other applications; whether any access ports are reserved and not allowed to handle multi-channel applications; whether the wireless switch 110 is set to prefer certain access points for multi-channel communication; etc.

In step 220, a primary access port is selected from among the access ports 150, 152, 154. Factors considered in selecting the primary access port may include the association information discussed above, the location of the mobile device 160, etc. For the purposes of this illustration, access port 150 will be designated the primary access port. In step 225, the mobile device 160 enters power save mode; communication is then accomplished using 802.11 PS-POLL messages.

In 802.11 PS-POLL mode, a mobile unit (e.g., mobile device 350) transmits all packets to an associated wireless node (e.g., the access points 310, 312, 314) with the P bit set in the packets. This indicates to the wireless node that the mobile unit is in power save mode and that it can therefore only send data to the mobile unit if the mobile unit sends a PS-POLL frame to retrieve any buffered data that the wireless node is storing. The mobile unit will periodically send such a PS-POLL frame to the wireless node. If the wireless node has buffered data for the mobile unit, it will then send a data packet and indicate whether it has more buffered data. If so, the mobile unit will continue to send PS-POLL frames until there is no more buffered data. Because the mobile unit is in power-save mode, the wireless node must indicate when there is buffered data available for the mobile unit. This is done by setting the TIM field in the wireless node's beacon. More specifically, at the time of association each mobile unit is given an association ID ("AID"), and when buffered data is available for a mobile unit the wireless node sets the TIM field with the AID of that particular mobile unit. The mobile unit periodically wakes up to inspect the beacon to determine whether the TIM field is set.

In step 230, a VoIP call is initiated by the mobile device 160. In step 235, the mobile device 160 begins transmission of data by transmitting a first packet to the primary access port 150. In step 240, it is determined whether the first packet was successfully received by the primary access port 150. If so (i.e., if an acknowledgement signal is received from primary access port 150), the mobile device transmits the same first packet to another of the access ports 152, 154. If the transmission was unsuccessful in step 240 (i.e., if no acknowledgement signal is received from primary access port 150), the mobile device 160 chooses another of the access ports 152, 154 to act as the primary access port and repeats its transmission from step 235.

Once transmission has been successful through both the primary access port 150 and a secondary access port 152, 154, in step 245 the wireless switch 110 parses the packets it has received in order that only one copy of a given first packet is transmitted to the communications network 120. In step 250, the wireless switch 110 sends a single instance of the first packet to the communications network 120. In step 255, the wireless switch receives a second packet from the communications network 120 in response to the transmission of the first packet. In step 260, the wireless switch 110 sends the second packet to each of the access ports 150, 152, 154 that is associated with the mobile device 160. The second packet is stored in a buffer within access ports 150, 152, 154 until the mobile device 160 attempts to retrieve it.

As previously stated, in step 225 the mobile device 160 entered power saving mode. Accordingly, in step 265 the mobile device 160 sends PS-POLL inquiries to the access ports 150, 152, 154 with which it is associated. These inquiries determine whether each of the access ports 150, 152, 154 is buffering a second packet for mobile device 160. In step 270, any of the access ports 150, 152, 154 that are storing the second packet sends the second packet to the mobile device 160. In step 275, the mobile device 160 parses the packets that have been received from the access ports 150, 152, 154 in step 270, and discards redundant packets that have been received more than once.

It should be noted that the level of redundancy can be determined by, for example, the configuration of mobile device 160 or of wireless switch 110. The above describes a configuration wherein a packet is always transmitted over one primary access port and one redundant access port. However, in other exemplary embodiments, a packet may be transmitted over more than one redundant access port in addition to the primary access port. Alternately, in another exemplary embodiment, a packet may only be transmitted over a redundant access port if there has been some indication of a failure (e.g., failure to receive an acknowledgement signal) in the transmission to the primary access port.

Figure 3:
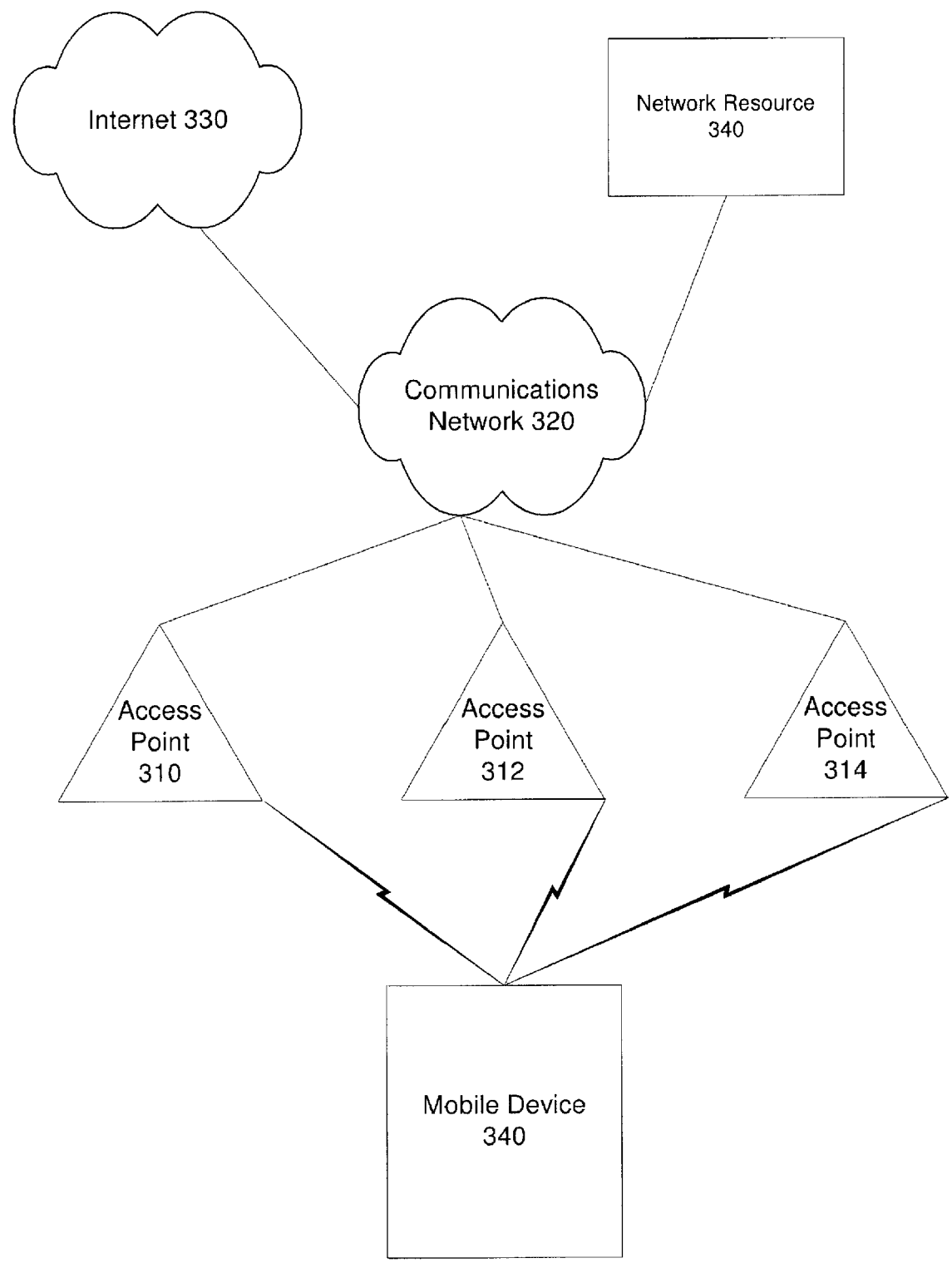
FIG. 3 shows a second exemplary system according to the present invention.

FIG. 3 shows another exemplary system according to the present invention. The system 300 includes a plurality of access points 310, 312, 314 that connect directly to the communications network 320 without an intervening element, such as the wireless switch 110 of system 100. The access points may be, for example, the AP-5131 Access Point manufactured by Motorola. The communications network 320 may be, for example, a corporate intranet. Through the communications network 320, the access points 310, 312, 314 may be able to access the Internet 330, as well as other network resources 340. Network resources 340 may be, for example, data storage, network printing resources, etc. The present invention also covers networks in which the access points 310, 312, 314 directly access the Internet 330. Moreover, network resource 340 may reside in communications network 320 or the Internet 330.

Communication between the communications network 320 and the access points 310, 312, 314 may be wired or wireless. Those of ordinary skill in the art will understand that the precise number of access points 310, 312, 314 present in the system 300 will vary among different implementations of the system 300; the use of three access points 310, 312, 314 in FIG. 3 is merely intended to be exemplary. The access points 310, 312, 314 have the capability to communicate wirelessly with various other computing resources. Such communication may be accomplished, for example, using one of the IEEE 802.11x family of wireless protocols (e.g., 802.11a, 802.11b, 802.11g, 802.11n).

Figure 4:
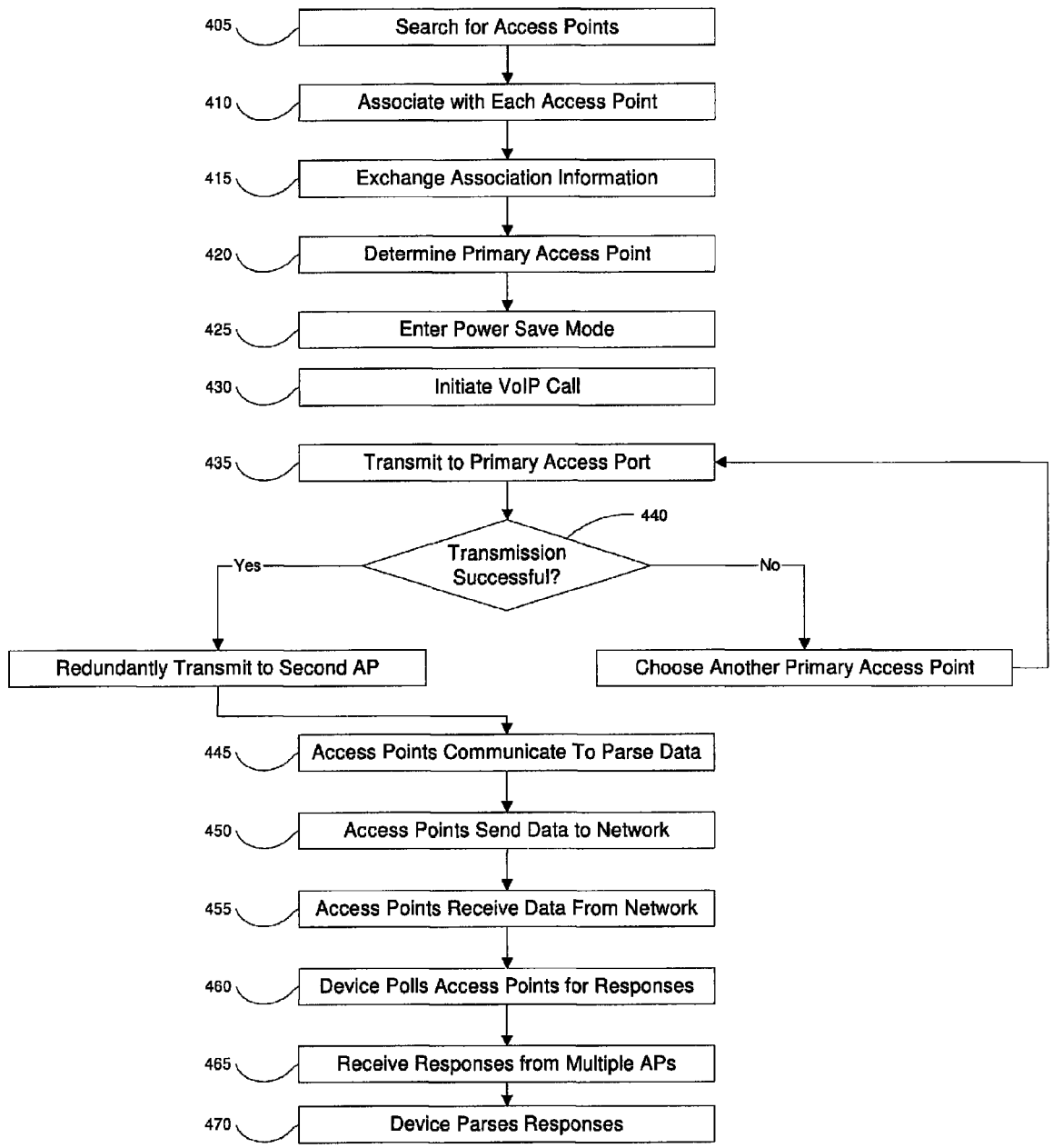
FIG. 4 shows a second exemplary method according to the present invention, by which the exemplary system of FIG. 3 may operate.

According to the present invention, a mobile device 350 may attempt to communicate with the access points 310, 312, 314. The mobile device may be, for example, a personal digital assistant ("PDA"), a scanner, a mobile computer, etc. The communication may be illustrated by the exemplary method 400 of the present invention shown in FIG. 4. In step 405, the mobile device 350 searches for access ports within its communication range. The communication range may depend on, for example, the type of the device 350 or the communications protocol used. In step 410, the mobile device 350 attempts to associate with all access points 310, 312, 314 found within its communication range. In another embodiment of the present invention, the number of access points with which the mobile device 350 associates may be limited to a predetermined maximum. The mobile device 350 attempts to form an association with each of the access points 310, 312, 314 on a separate 802.11 channel. (In the United States a device using the 802.11b wireless protocol has access to channels 1 through 11, with varying frequencies. The mobile device 350 may, for example, attempt to associate with access point 310 on channel 1, with access point 312 on channel 6, and with access point 314 on channel 11.)

Once associations have been formed, in step 415, the mobile device 350 and the access points 310, 312, 314 exchange association information. Association information may be, for example, the location of each access point relative to the other access points; the communication channels available to each access point; the load of each access point (e.g., the number of mobile devices associated with each access point, the number of VoIP calls active on each access point, etc.); whether any of the access points are designated for multi-channel, voice, or other applications; whether any access points are reserved and not allowed to handle multi-channel applications; etc.

In step 420, a primary access point is selected from among the access points 310, 312, 314. Factors considered in selecting the primary access point may include the association information discussed above, the location of the mobile device 350, etc. For the purposes of this illustration, access point 310 will be designated the primary access point. In step 425, the mobile device 350 enters power save mode; communication is then accomplished using 802.11 PS-POLL messages, as described above.

In step 430, a VoIP call is initiated by the mobile device 350. In step 435, the mobile device 350 begins transmission of data by transmitting a first packet to the primary access point 310. In step 440, it is determined whether the primary access point 310 successfully received the first packet. If so (i.e., if an acknowledgement signal is received from primary access point 310), the mobile device transmits the same first packet to another of the access points 312, 314. If the transmission was unsuccessful in step 440 (i.e., if no acknowledgement signal is received from primary access point 310), the mobile device 350 chooses another of the access points 312, 314 to act as the primary access point and repeats its transmission from step 435.

Once transmission has been successful through both the primary access point 310 and a secondary access point 312, 314 (or, alternately, through one of the secondary access points 312, 314 that has been designated as the new primary access point due to a failure in the transmission to primary access point 310, and through the other of the secondary access points 312, 314), in step 445 the access points 310, 312, 314 communicate with one another to determine the level of redundancy that has been achieved, in order that only one of a given first packet is transmitted to the communications network 320. In step 450, one of the access points 310, 312, 314 sends a single instance of the first packet to the communications network 320. In step 455, communications network 320 sends a second packet to all of the access points 310, 312, 314 that are associated with the mobile device 350 in response to the transmission of the first packet. The second packet is stored in a buffer within access points 310, 312, 314 until the mobile device 350 attempts to retrieve it.

As previously stated, in step 425 the mobile device 350 entered power saving mode. Accordingly, in step 460 the mobile device 350 sends PS-POLL inquiries to the access points 310, 312, 314 with which it is associated. These inquiries determine whether any or all of the access points 310, 312, 314 are buffering a second packet for mobile device 350. In step 465, any of the access points 310, 312, 314 that are storing the second packet sends the second packet to the mobile device 350. In step 470, the mobile device 350 parses any packets that have been received from the access points 310, 312, 314 and discards any redundant packets.

As for the exemplary system 100 described above, the level of redundancy can be determined by, for example, the configuration of mobile device 350 or of communications network 320. The above describes a configuration wherein a packet is always transmitted over one primary access point and one redundant access point. However, in other exemplary embodiments, a packet may be transmitted over the primary access point and more than one redundant access point. Alternately, in another exemplary embodiment, a packet may only be transmitted over a redundant access point if there has been some indication of a failure (e.g., lack of an acknowledgement signal) in the transmission to the primary access point.

Through the use of the above-described exemplary embodiments, redundant transmission of packets to a mobile device can be achieved. Such redundant transmission is particularly well suited to improving the efficiency of VoIP communications, which frequently experience jitter and/or latency due to dropped packets. Because each packet may be transmitted more than once under the above exemplary methods, packets are dropped much less frequently, if at all, resulting in improved call quality. Further, though the above exemplary embodiments are suited to transmitting VoIP packets, the same principles may be applied to any other type of data that may be transmitted by a mobile device that is wirelessly connected to a network using one of the 802.11 family of protocols.

Both exemplary system 100 and exemplary system 300 may accomplish such redundant transmission. However, because the exemplary system 100 includes the wireless switch 100, which may be configured to sort and send redundant packets to and from mobile devices, the system 100 operates more quickly and efficiently than the system 300, and is therefore the preferred exemplary embodiment.

Those of ordinary skill in the art will recognize that while the above exemplary embodiments have been described with reference to the transmission of VoIP data packets, such description should be read in an illustrative, rather than limiting, sense. The same principles can also be applied to the transmission of video data, best effort data, background data, or any other type of data that may be sent using 802.11 protocols.

What is claimed is:
1. A system, comprising:
a wireless switch; and
a plurality of wireless nodes, herein a mobile device connects to the wireless switch by:
transmitting a data packet to the wireless switch via a primary associated wireless node;
receiving an indication from the primary associated wireless node as to whether the data packet was successfully received; and
transmitting the same data packet to the wireless switch via at least one other associated wireless node, and
wherein the wireless nodes communicate with one another to determine the achieved level of redundancy of the same packet in order that only one access point sends on a single instance of the data packet to the wireless switch, and the at least one other associated wireless node discards the redundant packet, and
wherein the wireless switch transmits the single instance of the packet on to a communication network.

2. The system of claim 1, wherein the indication is an acknowledgement.

3. The system of claim 1, the wireless nodes communicate with one another to determine the achieved level of redundancy of the same packet in order that only one access point sends on a single instance of the data packet, and wherein the mobile device is also operable to receive multiple copies of a same response data packet from the associated wireless nodes, parse those packets, and discard redundant packets.

4. The system of claim 1, wherein the indication is a failure to receive an acknowledgement.

5. The system of claim 1, wherein the wireless nodes communicate with one another to determine the achieved level of redundancy of the same data packet in order that only one access point sends on a single instance of the data packet.

6. A method, comprising:
associating a mobile device with at least two wireless nodes;
transmitting, by the mobile device, a data packet to a first wireless node of the at least two wireless nodes;
receiving an indication from the first wireless node as to whether the data packet was successfully received;
transmitting, by the mobile device, the same data packet to a second wireless node of the at least two wireless nodes;
communicating between the wireless nodes to determine the achieved level of redundancy of the same packet in order that only one access point sends on a single instance of the data packet to the wireless switch;
discarding the redundant packet by the other wireless node; and
transmitting the packet on to a communication network by the one access point.

7. The method of claim 6, wherein the indication is an acknowledgement.

8. The method of claim 6, the wireless nodes communicate with one another to determine the achieved level of redundancy of the same packet in order that only one access point sends on a single instance of the data packet, and wherein the mobile device is also operable to receive multiple copies of a same response data packet from the first and second wireless nodes, parse those packets, and discard redundant packets.

9. The method of claim 6, wherein the mobile device associates with each of the wireless nodes using a distinct one of a plurality of 802.11 channels.

10. The method of claim 6, wherein the indication is a failure to receive an acknowledgement.

11. The method of claim 6, wherein the wireless nodes communicate with one another to determine the achieved level of redundancy of the same data packet in order that only one access point sends on a single instance of the data packet.

* * * * *

UNITED STATES PATENT AND TRADEMARK OFFICE
CERTIFICATE OF CORRECTION

| | |
|---|---|
| PATENT NO. | : 8,134,985 B2 |
| APPLICATION NO. | : 12/057631 |
| DATED | : March 13, 2012 |
| INVENTOR(S) | : Hong |

It is certified that error appears in the above-identified patent and that said Letters Patent is hereby corrected as shown below:

In the Drawings:
In Fig. 3, Drawing Sheet 3 of 4, delete "Mobile Device 340" and insert -- Mobile Device 350 --, therefor.

In the Specifications:
In Column 1, Line 34, delete "IF" and insert -- IP --, therefor.

In Column 6, Lines 51-52, delete "wireless switch 100," and insert -- wireless switch 110, --, therefor.

In the Claims:
In Column 7, Line 1, in Claim 1, delete "herein" and insert -- wherein --, therefor.

Signed and Sealed this
Sixteenth Day of April, 2013

Teresa Stanek Rea
*Acting Director of the United States Patent and Trademark Office*